United States Patent [19]

Schwaller

[11] Patent Number: 5,268,602
[45] Date of Patent: Dec. 7, 1993

[54] ELECTRIC MACHINE, ESPECIALLY A DYNAMO FOR MOUNTING ON A WHEEL HUB

[75] Inventor: Edwin Schwaller, Küttigen, Switzerland

[73] Assignee: Vereinigte Drahtwerke A.G., Biel, Switzerland

[21] Appl. No.: 929,297

[22] Filed: Aug. 13, 1992

[30] Foreign Application Priority Data

Aug. 20, 1991 [CH] Switzerland ............ 2443/91

[51] Int. Cl.$^5$ ............................................. H02K 11/00
[52] U.S. Cl. .................................. 310/67 A; 310/156; 310/DIG. 6
[58] Field of Search ............ 310/67 A, 67 R, 78, 310/103, 156, 261, DIG. 6

[56] References Cited

U.S. PATENT DOCUMENTS

| | | | |
|---|---|---|---|
| 2,430,705 | 11/1947 | Brown ............................... | 310/67 A |
| 3,259,768 | 7/1966 | Burr .................................... | 310/13 |
| 4,645,961 | 2/1987 | Malsky ............................... | 310/156 |
| 4,860,176 | 8/1989 | Bauwens et al. .................. | 310/67 A |
| 4,986,556 | 1/1991 | Hartmann ........................... | 280/260 |
| 5,115,159 | 5/1992 | Takamiya et al. ................. | 310/67 A |

FOREIGN PATENT DOCUMENTS

| | | | |
|---|---|---|---|
| 225132 | 10/1987 | European Pat. Off. ............ | 310/254 |
| 425260 | 5/1991 | European Pat. Off. ............ | 310/67 A |
| 839059 | 5/1952 | Fed. Rep. of Germany .... | 310/67 R |
| 2532574 | 2/1977 | Fed. Rep. of Germany ...... | 310/111 |
| 2743837 | 5/1979 | Fed. Rep. of Germany .... | 310/67 R |
| 2236301 | 1/1975 | France ............................... | 310/67 R |
| 200883 | 2/1939 | Switzerland ....................... | 310/67 A |
| 228802 | 12/1943 | Switzerland ....................... | 310/67 R |
| 263173 | 11/1949 | Switzerland ....................... | 310/67 A |

*Primary Examiner*—Steven L. Stephan
*Assistant Examiner*—Matthew Nguyen
*Attorney, Agent, or Firm*—Ladas & Parry

[57] ABSTRACT

An electric machine within a hub housing rotatably disposed on an axle. A magnetic rotor is mounted on and can be rotated about the axle and is driven by the rotation of the hub housing by means of a transmission. The magnetic rotor comprises a central support carrying a plurality of axially aligned permanent-magnetic rods arranged in a star-shaped configuration. A coil assembly in the form of a cylindrical shell is arranged around the magnetic rotor. This design results in a compact and easy to assemble configuration with an overall efficiency higher than 0.5.

18 Claims, 3 Drawing Sheets

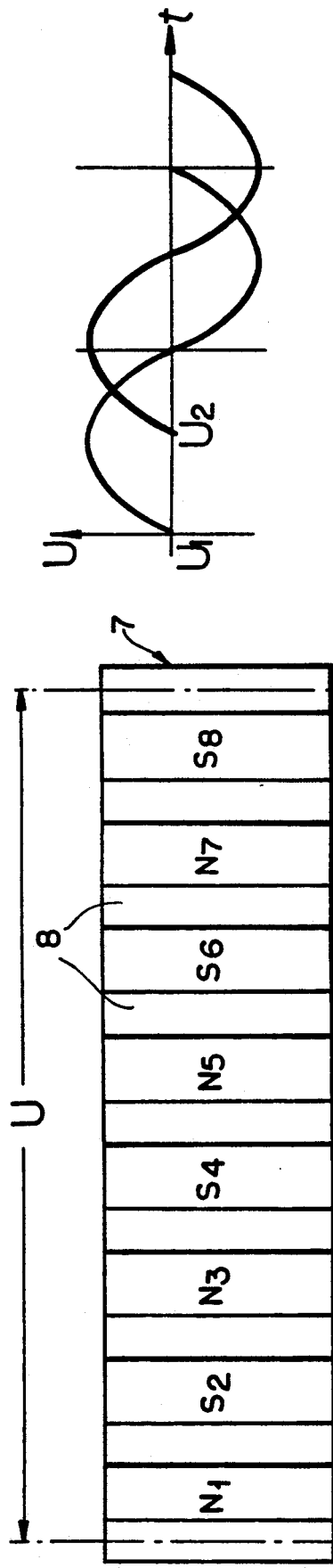
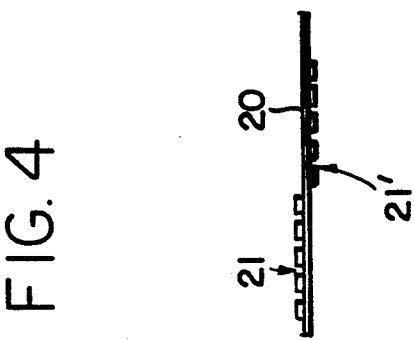
FIG. 4
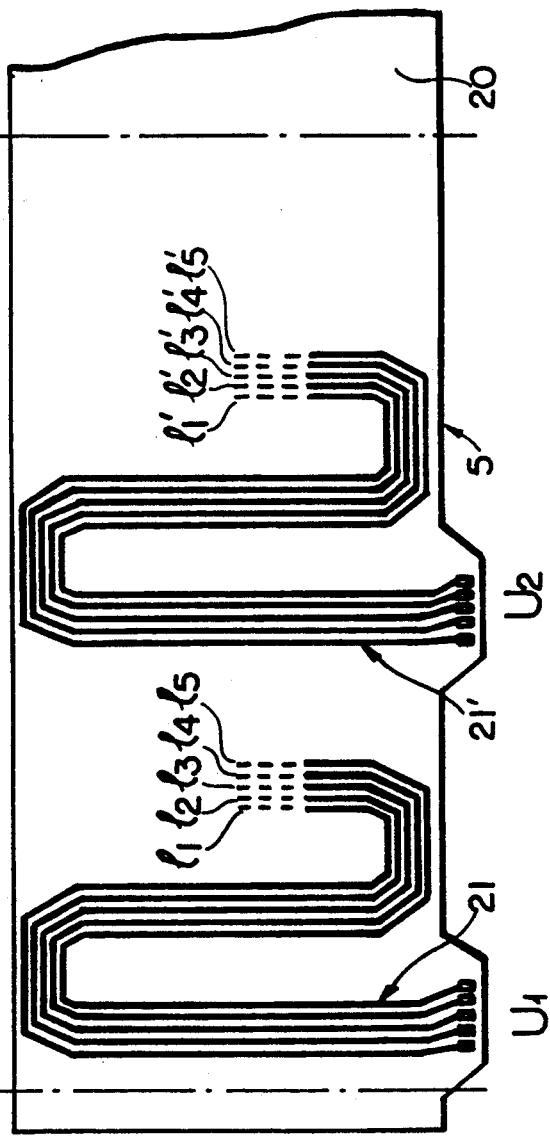
FIG. 5
FIG. 3

ELECTRIC MACHINE, ESPECIALLY A DYNAMO FOR MOUNTING ON A WHEEL HUB

FIELD OF THE INVENTION

The invention relates to an electric machine with a central assembly of permanent magnets and a coil assembly enclosing said central assembly coaxially, wherein said coil assembly and said central assembly can be rotated relatively to each other.

BACKGROUND OF THE INVENTION

It is well known that machines of this kind can be used either as motors or as generators. The present invention relates to both these alternatives. The following description of an embodiment of a dynamo must be understood as an example for a preferred application of the invention but is not to be understood as a limitation of the scope of the invention.

For generating electrical power to illuminate bicycle lamps, dynamos of various designs are used. In most cases the dynamos are driven by a wheel in frictional contact with a tire of the bicycle. Such dynamos have usually a poor efficiency. The resulting electrical power is low in comparison with the frictional resistance required for driving the dynamo.

An alternative is offered by dynamos mounted in the hub of the wheel. These dynamos are driven by the rotation of the hub. Since the hub offers only limited room for housing a dynamo, this design has been relatively expensive and the corresponding constructions reached only poor efficiency.

SUMMARY OF THE INVENTION

It is an object of the invention to provide an electric machine of this kind, which is compact and has a good efficiency without being expensive in production and which is especially suited for an installation as a dynamo in a wheel hub.

The invention consists of a coil assembly enclosing a central assembly of a plurality of axially aligned permanent-magnetic rods. The rods are arranged in a star-shaped configuration. The coil assembly can be rotated relatively to the central assembly. The star-shaped configuration of the permanent-magnetic rods requires only little housing room and a small magnetic volume but generates a homogeneous magnetic field operating at low magnetic losses. The arrangement of the coils allows to dispose with sliding contacts, therefore eliminating the corresponding voltage losses.

BRIEF DESCRIPTION OF THE DRAWINGS

The invention will be better understood and objects other than those set forth above will become apparent by referring to the following description of one of the embodiments of the invention, and to the drawings, wherein

FIG. 3 is a schematic representation of a development of the coil assembly and the assembly of eight magnetic rods;

FIG. 4 is a plot of time versus voltage corresponding to FIG. 3; and

FIG. 5 is a schematic sectional view through a foil with the printed circuit of the coil assembly.

DESCRIPTION OF THE PREFERRED EMBODIMENT

Figure 1:
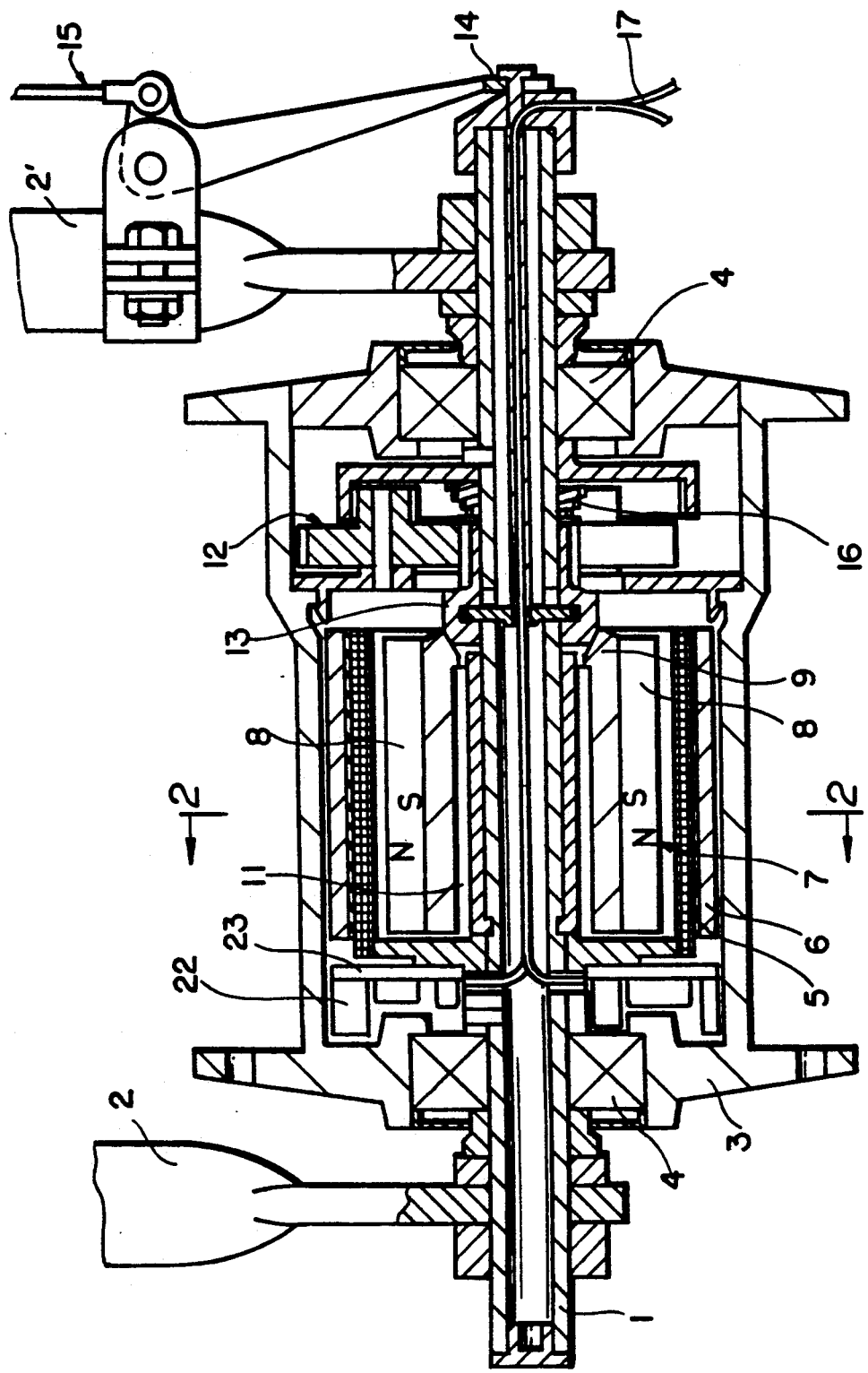
FIG. 1 is a sectional view along the axle of the dynamo mounted on the wheel hub.

As can be seen from FIG. 1, the dynamo of the present embodiment is located on the axle 1 of a wheel. The axle 1 is fixed in a well-known construction to the fork 2, 2' of a bicycle. A hub housing 3 is rotatably mounted to the axle 1 by means of bearings 4. The spokes of the wheel are connected to the hub housing.

A nonrotating coil assembly 5, 6 is arranged inside the hub housing 3 and is protected by it. A coil 5 is shaped in the form of a cylindrical shell and is inserted into a cylindrical support shell 6, which is of a highly magnetically permeable material. An insulating foil is arranged between the coil 5 and the support shell 6 to prevent a short circuit of the coil leads. The support shell is a package of iron rings axially laminated to each other. The iron rings are separated from each other by layers of an electrically insulating material, preferably electro-protectional varnish. The iron rings are combined to the support shell 6 by punch-packaging.

The use of mutually insulated, packed metal foils as support shell reduces eddy current losses considerably and contributes to the high efficiency of the machine. The magnetic field lines originating from neighboring poles are guided through the support shell i.e. the support shell acts as a duct for the magnetic field lines. Besides its magnetic functions the rigid support shell is a means of exactly centering the coil 5 and acts as a heat sink for the coil. The air gap between the coil 5 and a magnetic rotor 7 arranged within the coil can therefore be kept small with minimum tolerances. Since the coil 5 is not rotated, it is possible to use a direct electric connection provided by leads 17, which are led through the axle 1 to the outside of the hub housing.

Figure 2:
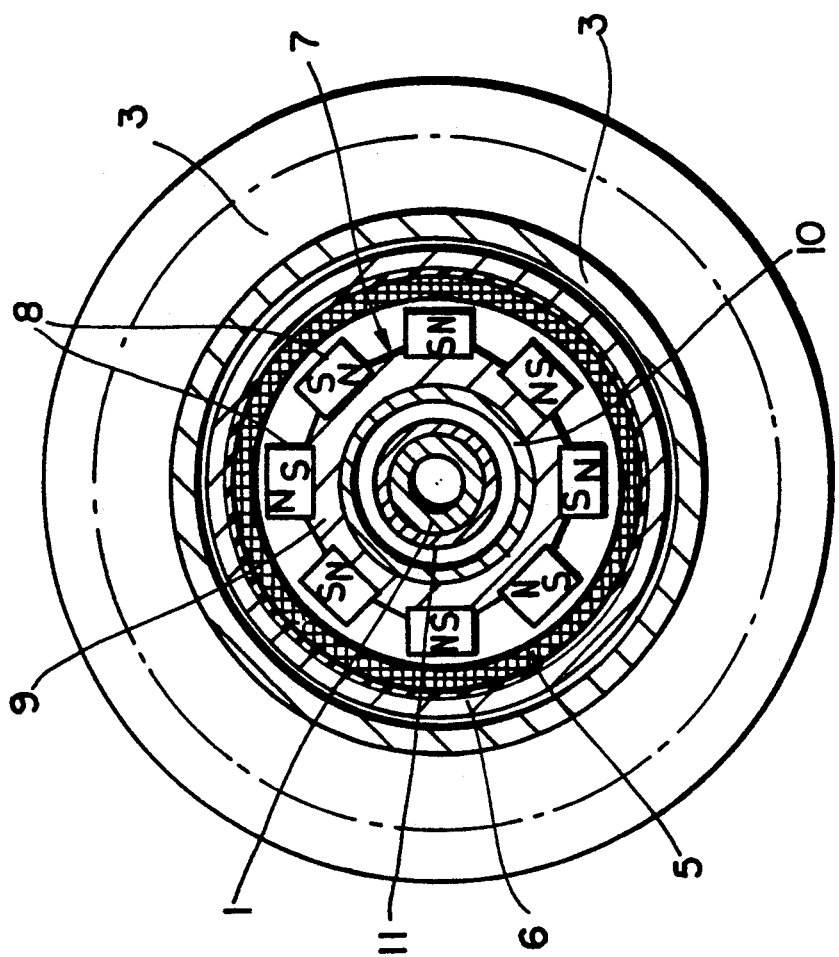
FIG. 2 is a sectional view along line II—II of FIG. 1.

The arrangement of the magnetic rotor 7 is shown in FIGS. 1 and 2. It comprises a plurality of magnetic rods 8—eight are used in this embodiment. They are made from a material of a high magnetic density in the order of 200 KJ/m$^3$. The rods are axially aligned and arranged in a star shaped configuration around the axle with alternatingly outward facing north and south poles. The magnetic rods 8 are mounted on a iron support member 9, through which the inner magnetic circuit of neighboring magnetic rods is closed. Preferably the magnets are glued into axial recesses of the support member 9.

The star shaped configuration of the axially arranged magnetic rods 8 is such that the permanent-magnetic rods are magnetized in radial direction with their outer ends being alternatingly north and south poles. The number of magnets, i.e. the number of poles, is preferably between six and ten. This arrangement of the magnets leads to a homogeneous magnetic field in the area of the coil with low magnetic losses. As it can be seen in FIG. 2, the magnetic volume can be kept low, which results in a reduction of costs. The rotational resistance is low in idling operation and independent of the position of the rotor in idling and generating operation, which results in a smooth operation of the machine.

FIG. 3 shows a development of the coil assembly 5 together with a development of the assembly 7 of permanent magnets. In the dynamo these two assemblies are wound into cylindric shape and arranged coaxially. The coil assembly 5 comprises a printed circuit 21 with a group of substantially parallel leads $l_1$ to $l_5$ extending substantially the whole length of the top surface of a foil 20 and a printed circuit 21' with a group of leads $l'_1$ to l'₅ extending substantially the whole length of the bottom surface of the foil 20, as can be seen from FIGS. 3 and 5. The leads are arranged in a meandering configuration such that they intersect the magnetic field lines, which extend nearly radially from the permanent-magnetic rods 8, perpendicularly, the meandering pattern having, when wound up, an angular period corresponding to an angular period of the cylindrical assembly of permanent magnets as shown by their developments in FIG. 3. The leads on the bottom surface are shifted in respect to the leads on the top surface such that the corresponding voltages $U_1$ and $U_2$ have a phase shift of 90°, as is shown in FIG. 4. Thus, after rectification and superposition of these voltages a DC-voltage with only small ripple is generated.

The ends of the leads are connected in such a way that the leads $l_1$ to $l_5$ and the leads $l'_1$ to $l'_5$ are in series.

The effective number of windings N can be calculated from the number n of leads per side of the foil, the number of poles Z, and the number of windings of the foil 20 W: $N = n \cdot Z \cdot W$, for each side of the foil. With $n=5$, $Z=8$, and $W=10$ the effective number of windings N is 400. As can be seen immediately, N can easily be influenced by changing n, Z, or W.

As already mentioned earlier, the wound-up foil 20 is arranged in the metallic support shell 6, by which arrangement a coaxial shape and centering of the foil is guaranteed.

In the present embodiment of a dynamo mounted on a wheel hub the magnetic rotor is driven from the rotation of the wheel and the hub housing by means of a transmission 12. As can be seen from FIG. 1, in the preferred embodiment a planetary transmission with a transmission ratio larger than 10 is used, which is disposed on one side of the magnetic rotor 7. The planetary transmission connects the hub housing 3 to a clutch 13 located on the axle 1. The clutch 13 rotating on the axle 1 is brought into frictional contact with the magnetic rotor 7 by means of a spring 16 and can be disengaged by means of a disengaging mechanism 14 actuated by pulling a cable 15, which provides a remote control for switching the dynamo on and off. If the dynamo is not used, the clutch is disengaged from the magnetic rotor 7 and the rotor stands still.

The preferred embodiment also comprises electric components 22 mounted on a printed circuit 23, which is attached to the nonrotating axle 1 inside the hub housing 3. This circuit is provided for regulating and converting the output voltage and current such that they are within specified or prescribed limits, which are given for bicycle dynamos. An inductive coil is used to flatten the nearly linear speed-voltage characteristic of the dynamo at higher speeds. A Zener-diode is provided for limiting the voltage to 7 V. Alternatively, an electronic regulation of the output voltage can be provided, the components of which can be mounted on the printed circuit 23.

The described dynamo can therefore be used instead of a conventional dynamo to provide power for conventional bicycle lamps while having a considerably better efficiency.

In operation the described machine has a mechanical efficiency of approximately 0.7 and electric efficiency of approximately 0.8 and therefore a resulting overall efficiency of more than 0.5. Already at a driving speed of 5 km/h (walking speed) the dynamo generates a voltage of 3.0 V at 25 Hz, which is sufficient for bicycle illumination even at small speed. The described electric machine is therefore especially suited for powering bicycle illuminations. It can also be used to supply power for bicycle electronics, including automatic parking lights.

Other applications of the invention as generator or electric drive can be implemented in analogous ways, by adapting the controls and mechanical setup.

While there is shown and described a present preferred embodiment of the invention, it is to be distinctly understood that the invention is not limited thereto, but may be otherwise variously embodied and practiced within the scope of the following claims.

I claim:

1. In a dynamo mounted in a wheel hub, said dynamo having an assembly of permanent magnets about an axis and a coil assembly about said assembly of permanent magnets coaxially, said assembly of permanent magnets and said coil assembly being rotatable relative to each other, the improvements wherein:

said assembly of permanent magnets comprises a plurality of axially aligned, radially magnetized permanent-magnetic rods; and said coil assembly comprises a cylindrical support shell of a highly magnetically permeable material for acting as a duct for magnetic field lines, and a plurality of substantially parallel leads of a printed circuit on a support foil, said support foil being wound up and inserted into said support shell, said leads extending substantially along a whole length of said support foil in a meandering pattern on said support foil such that an angular period of said meandering pattern when said support foil is wound up corresponds to an angular period of said assembly of permanent magnetic rods, and said leads being connected in series to each other.

2. The dynamo of claim 1, wherein said permanent-magnetic rods are attached at the outside of a central support member, said central support member having axial recesses for holding said permanent-magnetic rods.

3. The dynamo of claim 1, wherein inner and outer ends of said permanent-magnetic rods are alternatingly magnetic north and south poles.

4. The dynamo of claim 1, wherein said assembly of permanent magnets comprises between 6 and 10 permanent-magnetic rods.

5. The dynamo of claim 1, wherein said support shell is a package of laminated metal sheets.

6. The dynamo of claim 5, wherein said package of laminated metal sheets consists of axially laminated rings separated by electrically insulating layers.

7. The dynamo of claim 5, and further comprising an electrically insulating layer between said support shell and said support foil when said support foil has been inserted onto said support shell, said insulating layer forming a thermally conducting contact between said support shell and said support foil.

8. The dynamo of claim 6, and further comprising an electrically insulating layer between said support shell and said support foil when said support foil has been inserted into said support shell, said insulating layer forming a thermally conducting contact between said support shell and said support foil.

9. The dynamo of claim 1, wherein said wheel hub comprises a hub housing rotatably mounted on an axle, and wherein said assembly of permanent magnets is rotatably mounted as a magnetic rotor on said axle within said coil assembly.

10. The dynamo of claim 9, wherein said magnetic rotor is driven by a gear transmission, said gear transmission being driven by a rotation of said hub housing.

11. The dynamo of claim 10, and further comprising a clutch, said clutch being controllable from outside said hub housing for engaging and disengaging said gear transmission.

12. The dynamo of claim 9, wherein said coil assembly is mounted on said axle and not rotatable relative to said axle, and wherein leads to said coil assembly from outside said hub housing are led through said axle.

13. The dynamo of claim 9, and further comprising an electrical control circuit inside said hub housing, said control circuit comprising one of a voltage controller and inductor respectively for regulating and limiting an output voltage of said coil assembly.

14. The dynamo of claim 6, wherein said wheel hub comprises a hub housing rotatably mounted on an axle, and wherein said assembly of permanent magnets is rotatably mounted as a magnetic rotor on said axle within said coil assembly.

15. The dynamo of claim 14, wherein said magnetic rotor is driven by a gear transmission, said gear transmission being driven by a rotation of said hub housing.

16. The dynamo of claim 15, and further comprising a clutch, said clutch being controllable from outside said hub housing for engaging and disengaging said gear transmission.

17. The dynamo of claim 14, wherein said coil assembly is mounted on said axle and not rotatable relative to said axle, and wherein leads to said coil assembly from outside said hub housing are led through said axle.

18. The machine of claim 1, wherein said leads are arranged on both of opposite sides of said support foil.

* * * * *